United States Patent [19]
Lohse

[11] Patent Number: 5,851,145
[45] Date of Patent: Dec. 22, 1998

[54] HAND PORTABLE GRAIN THRESHING DEVICE

[76] Inventor: Lester J. Lohse, 1006 2nd Ave. E, Williston, N. Dak. 58801

[21] Appl. No.: 844,560

[22] Filed: Apr. 21, 1997

[51] Int. Cl.⁶ ...................................................... A01F 05/00
[52] U.S. Cl. ................................. 460/61; 56/16.5; 56/239
[58] Field of Search ................................ 460/119, 61, 24, 460/45, 96, 901, 64, 65; 56/16.4, 16.5, 126, 219, 222, 239

[56] References Cited

U.S. PATENT DOCUMENTS

| | | | |
|---|---|---|---|
| 4,337,782 | 7/1982 | Da Silva | 460/64 |
| 4,417,593 | 11/1983 | Brehon | 460/73 |
| 4,724,632 | 2/1988 | Bilsland et al. | 460/61 X |
| 5,041,058 | 8/1991 | Quimby | 460/61 |
| 5,106,340 | 4/1992 | Quimby | 460/61 |
| 5,569,079 | 10/1996 | Ryden et al. | 56/16.5 X |

Primary Examiner—Terry Lee Melius
Attorney, Agent, or Firm—David A. Lingbeck

[57] ABSTRACT

A hand portable grain threshing device includes a base, a reel with elongate paddle members, a mesh screen mounted over the top of the reel, a trough and collection member for collecting grain heads or kernels, a variable speed actuator for rotating the reel which cuts the stems of crop plants below the grain heads and which centrifuges the grain heads into the trough, and a blower unit for blowing the chaff out of the threshing device and moving the grain heads into the collection member. The user carries this threshing device into a field and holds this device upon the crop plants with the crop plants extending upward within the device, and the paddle members in cooperation with the front edge of the base cuts off the stems below the grain heads which are centrifuged about the interior side of the mesh screen into the trough and into the collection member for the user to test the amount of moisture in the grain heads.

19 Claims, 2 Drawing Sheets

HAND PORTABLE GRAIN THRESHING DEVICE

BACKGROUND OF THE INVENTION

This invention relates to a hand portable grain threshing device which is hand carried through a field with the crop heads being cut off and fed into the device upon which the grain is deposited in a collection member such as a cup. This device is used to sample the moisture in the grain as means of determining when it is time to harvest the crops.

Prior to the conception of machines for cutting off and collecting the grain heads of which are inspected for moisture content, farmers, in particular, either had to rub the grain heads out by hand or had to use a combine to cut off and retrieve a selected number of grain heads. Now there are different types of grain threshing devices used to perform these tasks. In order for some of these devices to work effectively, the grain heads including the stems are manually fed into the device; whereupon, the grain heads are separated from the stems and are collected in a container for whatever use the user deems proper.

One known prior art is a GRAIN SEPARATING DEVICE FOR THRESHING MACHINES, U.S. Pat. No. 739,908, issued on Sep. 29, 1903 and invented by Henry H. Nightengale, and which comprises a vertically-disposed casing having an inlet near its lower end, a fan-casing supported upon the vertically-disposed casing, a perforated cylinder disposed within and spaced from the vertically-disposed casing, and a suction fan within the fan casing.

Another known prior art is a HAND PORTABLE GRAIN THRESHING APPARATUS, U.S. Pat. No. 4,417,593, issued on Nov. 29, 1983 and invented by Garth A. Brehon, and which comprises two separate chambers one having a beater therein for threshing the grain and the other having a fan for causing air to flow through an open ended column, the beater being a two-prong rotor.

Another known prior art is a PORTABLE THRASHER, U.S. Pat. No. 5,041,058, issued on Aug. 20, 1991 and invented by Dean Quimby, and which comprises a housing with an interior, a mouth for passing crop heads into the interior, a grain discharge opening and a chaff discharge opening, a thrashing assembly including a prime mover mounted on the housing, a generally cylindrical flail subassembly driven by the prime mover and an oscillating sieve panel separating the housing interior into an upper, chaffed compartment and a lower, grain compartment.

None of the prior art describes a hand portable grain threshing device which allows the user to carry and walk with the device through a field and collect grain heads by cutting the stem off near the grain head and collecting the grain kernel in a collection member such as a cup.

SUMMARY OF THE INVENTION

The present invention relates to a hand portable grain threshing device which comprises a base having a plurality of notches for guiding and severing the stems of the crop plants, a reel including a reel shaft journaled through reel shaft supports which are adjustably mounted to bracket members and including a plurality of elongate paddle members connected at the ends of radially-extending paddle supports, a mesh screen being fastened to the base and archingly disposed over the reel, a trough attached to an edge of the mesh screen for collecting the grain heads, a pair of screen supports, a handle for carrying the device, a blower member for blowing the chaff out of the trough, and a variable speed motor for rotating the reel. The user places the threshing device such that a plurality of crop plants which are particularly arranged in a row, extend up into the threshing device in front of the base and inside the screen allowing the elongate paddle members to essentially cut the stems with the grain heads or kernels being centrifuged about the interior of the screen and being collected in a trough with the blower unit blowing the chaff out of the trough and urging the grain heads into a sieved collection member.

One objective of the present invention is to provide a hand portable grain threshing device which allows the user to effectively carry the device into a field and effectively cut the grain heads off the stems of the crop plants.

Another objective of the present invention is to provide a hand portable grain threshing device which, in addition to cutting the grain heads off the stems of the crop plants, also collects the grain heads in a collection member.

Yet, another objective of the present invention is to provide a hand portable grain threshing device which eliminates the user having to collect the grain heads by hand or by a harvester.

Further objectives and advantages of the present invention will become apparent as the description proceeds and when taken in conjunction with the accompanying drawings wherein:

DETAILED DESCRIPTION OF THE INVENTION

Figure 1:
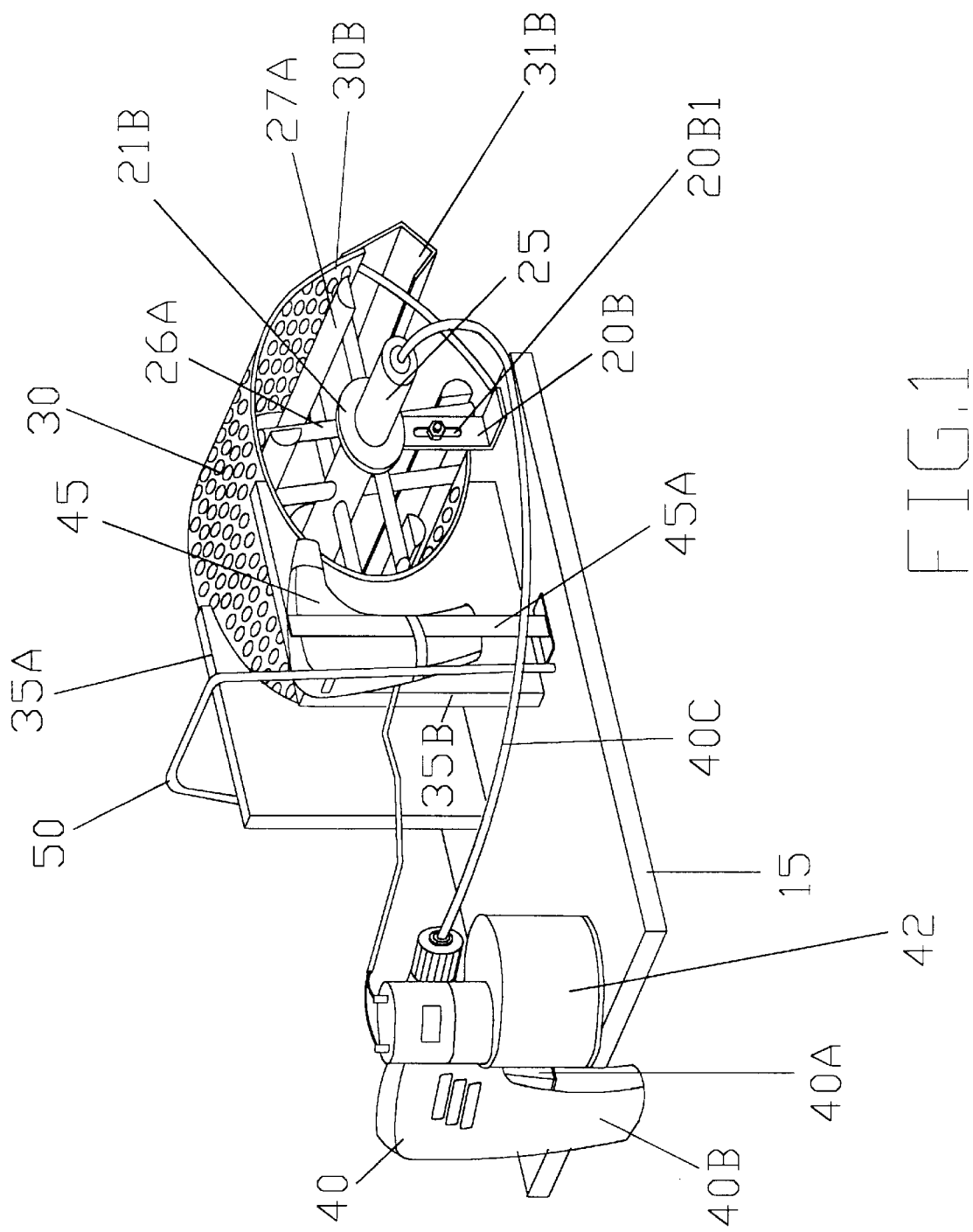
FIG. 1 is a top perspective view of the hand portable grain threshing device.
Figure 2:
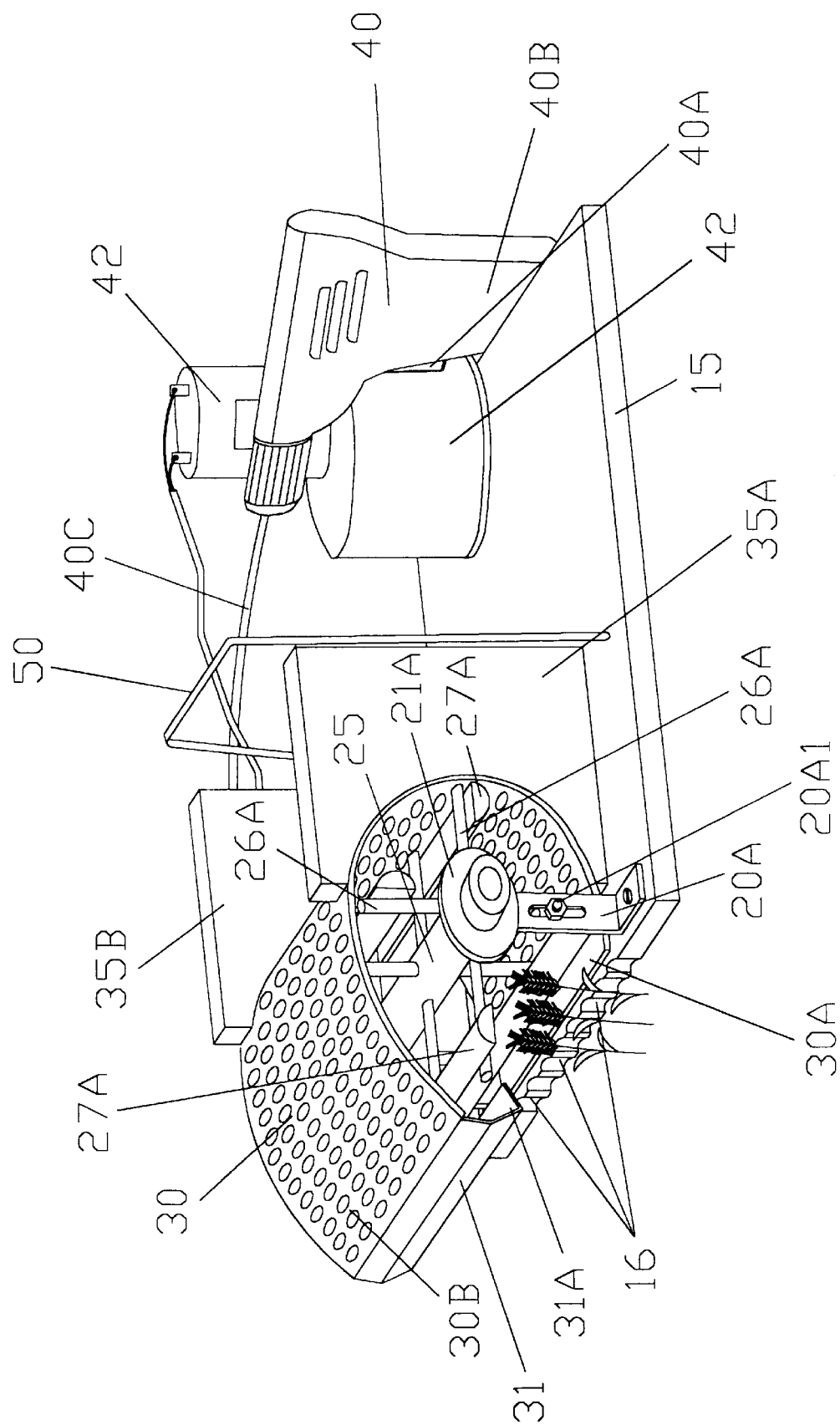
FIG. 2 is a side perspective view of the hand portable grain threshing device with crop plants being cut off and the grain heads being fed into the trough.

Referring to the drawings in FIGS. 1 & 2, in particular, the hand portable grain threshing device comprises essentially a planar base 15 having a front edge which includes a plurality of spaced apart notches 16 extending along the front edge and being adapted to receive and sever the stems of crop plants such as the stems of wheat and further having a handle member 50 fastened to the base 15 with conventional means such as bolts and nuts and extending upward intermediate of the base 15, and the grain threshing device further comprises a reel having a reel shaft 25 which has opposed ends journaled through a pair of reel supports 21A-B which are height adjustably mounted with fasteners to two spaced apart bracket members 20A-B which are fastened with conventional fastening members to the topside of the planar base 15 near the front edge thereof and wherein each bracket member 20A-B has a longitudinal slot 20A1-B1 through a lower portion thereof for receiving a conventional fastener such as a bolt for securing a respective reel support 21A-B to the bracket member 20A-B. The reel further comprises a plurality of radially-extending arms 26A each of which extend through the reel shaft 25 with the ends of the arms 26A being securely attached to generally horizontally disposed elongate paddle members 27A which rotate with the reel shaft 25 which is essentially horizontally disposed.

As illustrated in FIGS. 1 & 2, a substantially arcuate mesh screen 30 having a first edge 30A which is fastened with conventional fasteners along the front edge of the base 15 and which archingly extend over the top of the elongate paddle members 27A such that the second edge 30B of the arcuate mesh screen 30 is spacedly disposed forward of the elongate paddle members 27A relative to the base 15. The arcuate mesh screen 30 is securely supported by a pair of spaced apart upright screen supports 35A-B each of which has an arcuate front edge which is conformed to fittingly receive the back of the mesh screen 30 which is fastened with conventional means to the upright screen supports 35A-B which are secured to the base 15 with conventional means and which extend upward to near the top of the mesh screen 30 to substantially support the mesh screen 30 in its arch-like shape. A trough 31 is securely fastened with conventional means to the second edge 30B of the arcuate mesh screen 30 such that the trough 31 is disposed essentially within the interior of the mesh screen 30 and is slanted at approximately thirty degrees relative to the base 15 so that any grain heads collected in the trough 31 will effectively exit the trough 31 from an end 31A thereof and drop into a collection member (not shown) which includes a container with a sieve member covering an open end of the container in order to sift selected grain heads being collected by the user, the collection member securely depending with conventional means from the exit end of the trough 31.

As shown in FIGS. 1 & 2, an actuator 40 such as a variable speed gun-like tool with a cable 40C connected to an end of the reel shaft 25 for rotating the reel shaft 25 is securely attached to the back end of the base 15 with a conventional bracket. The actuator 40 has a handle portion 40B and a trigger 40A and a motor which energizes the rotation of the reel shaft 25 and which controls the speed at which the reel shaft 25 and the paddle members 27A rotate within the arcuate mesh screen 30. A battery 42 is also securely mounted on the base 15 with conventional means and is used to energize the actuator 40 and further energizes a blower unit 45 which is securely mounted to a blower unit support 45A which is securely mounted or fastened also to the base 15 with conventional means. The blower unit 45 is preferably elevated above the base 15 and is disposed at a height comparable to the top of the mesh screen 30 and is disposed near the back of the screen 30 and to one end of the reel which is not covered by the mesh screen 30 and where the end 31B of the trough 31 is elevated. The blower unit 45 is angled relative to the base 15 and the air forced by the blower unit 45 is directed at an angle toward the trough 31 to effectively remove the chaff from the grain threshing device and to facilitate movement of the grain heads or kernels from the trough 31 into the collection member.

In operation, the user preferably carries the grain threshing device by grasping the handle portion 40A on the actuator 40 with one hand and grasping the handle member 50 with the other hand and carries the grain threshing device into a field where a sample of the grain is to be collected. In order to collect a sample of grain heads from the field, the user energizes the blower unit 45 and the actuator 40 which rotates the reel shaft 25 and the elongate paddle members 27A within the mesh screen 30. While holding the device, the user then places the grain threshing device upon the crop plants such that the top portions of the stems extend upward into the device between the second edge 30B of the mesh screen and the front edge of the base 15 with the grain heads extending higher into the device relative to the second edge 30B of the mesh screen 30 and the front edge of the base 15. The elongate paddle members 27A rotate in a counterclockwise manner and as they rotate under the reel shaft 25, the elongate paddle members 27A do so toward the front edge of the base 15, and the stems of the crop pants below the grain heads are guided into the plurality of notches 16 in the front edge of the base 15 by the elongate paddle members 27A, and in cooperation with the front edge of the base 15, the stems are severed, and the grain heads including the remaining stems are centrifuged about the interior of the mesh screen 30 with the chaff and stems being separated from the grain heads as they come into contact with the mesh screen 30. The grain heads are centrifuged into the trough 31 and with the aid of the blower unit 45, the grain heads or kernels are moved from the trough 31 into the collection member where they are collected for use including sampling for moisture content. In addition to moving the grain heads or kernels into the collection member, the blower unit 45 also blows the chaff out of the grain threshing device. This device can be easily and conveniently carried to various locations throughout a field and be repeatedly used to collect various samples of grain heads and kernels for testing purposes.

Various changes and departures may be made to the invention without departing from the spirit and scope thereof. Accordingly, it is not intended that the invention be limited to that specifically described in the specification or as illustrated in the drawings but only as set forth in the claims.

What is claimed is:

1. A hand portable grain threshing device comprising:
   a base having a front edge;
   a reel including a plurality of radially-extending arms and a plurality of elongate paddle members and being rotatably mounted upon said base for severing stems of crop plants and for assisting in the collecting of grain heads;
   a means for supporting said reel upon said base;
   a mesh screen being archingly disposed over said reel and further having a first edge and a second edge;
   an actuator connected to said reel for rotating said reel at selected speeds;
   a means for collecting grain heads being attached to said screen; and
   a blower unit disposed above said base, for blowing chaff out of said hand portable grain threshing device and for generally assisting collecting of grain heads.

2. A hand portable grain threshing device as described in claim 1, wherein said front edge of said base has a plurality of notches spaced along thereof and being adapted to receive stems of crop plants and to facilitate removing grain heads from the crop plants.

3. A hand portable grain threshing device as described in claim 1, wherein said means for supporting said reel includes a pair of bracket members spacedly fastened to said base and a pair of reel support members each of which is adjustably attached to a respective one of said pair of bracket members.

4. A hand portable grain threshing device as described in claim 3, wherein said reel has a reel shaft which has ends each of which is journaled through a respective one of said pair of reel support members.

5. A hand portable grain threshing device as described in claim 4, wherein each of said pair of bracket members has a longitudinal slot therethrough for providing adjustable setting of said reel relative to said base.

6. A hand portable grain threshing device as described in claim 4, wherein said reel is adjustably disposed relative to said base such that said elongate paddle members in cooperation with said front edge of said base sever the stems and remove the grain heads from the crop plants.

7. A hand portable grain threshing device as described in claim 6, wherein said plurality of elongate paddle members are securely fastened at ends of said plurality of radially-extending arms and are disposed generally parallel to said reel shaft.

8. A hand portable grain threshing device as described in claim 7, wherein said reel shaft is generally disposed parallel to said front edge of said base.

9. A hand portable grain threshing device as described in claim 8, wherein said plurality of elongate paddle members adjustably rotate proximate to said front edge of said base such that said plurality of elongate paddle members in cooperation with said front edge of said base sever the stems and remove grain heads of the crop plants.

10. A hand portable grain threshing device as described in claim 9, wherein said actuator is essentially a battery-operated tool having a trigger and a handle portion and also includes a cable connected from said battery-operated tool to said reel shaft.

11. A hand portable grain threshing device as described in claim 10, wherein said trigger is adapted to allow a user to vary speed of rotation of said reel shaft.

12. A hand portable grain threshing device as described in claim 1, wherein said first edge of said mesh screen is securely fastened to said base, and a pair of upright screen supports is securely attached to said base to support said mesh screen.

13. A hand portable grain threshing device as described in claim 12, wherein said pair of upright screen supports are disposed upon said base to substantially secure said mesh screen in its arch-like shape over said reel.

14. A hand portable grain threshing device as described in claim 13, wherein each of said upright screen supports has a curved portion to receive and support a portion of said screen mesh and is securely attached to near a top of said mesh screen.

15. A hand portable grain threshing device as described in claim 12, wherein said second edge of said mesh screen is spaced forward relative to said front edge of said base to allow top portions of the stems of crop plants to extend upward between said second edge of said mesh screen and said front edge of said base so that the stems can be effectively severed by said paddle members and said front edge of said base.

16. A hand portable grain threshing device as described in claim 15, wherein said means for collecting grain heads includes a trough securely attached to said second edge of said screen.

17. A hand portable grain threshing device as described in claim 16, wherein said trough is slanted at approximately 30 degrees relative to said base to facilitate exiting of grain heads from said trough.

18. A hand portable grain threshing device as described in claim 1, wherein said blower unit is securely elevated above said base for effective and efficient removal of chaff from said grain threshing device and for effective and efficient collecting of grain heads from said trough.

19. A hand portable grain threshing device as described in claim 18, wherein said blower unit is angled relative to said base such that air forced by said blower unit is directed at an angle toward said trough to effectively collect grain heads from said trough.

* * * * *